United States Patent [19]

Herbelleau

[11] 4,215,736
[45] Aug. 5, 1980

[54] RADIAL TIRE WITH CROWN REINFORCEMENT BLOCK OF TWO SUPERIMPOSED PAIRS OF PLIES

[75] Inventor: Yves Herbelleau, Riom, France

[73] Assignee: Compagnie Generale des Etablissements Michelin, Clermont-Ferrand, France

[21] Appl. No.: 25,393

[22] Filed: Mar. 30, 1979

[30] Foreign Application Priority Data

Apr. 7, 1978 [FR] France ................ 78 11275

[51] Int. Cl.² .................. B60C 9/18; B60C 9/20
[52] U.S. Cl. .................. 152/361 R; 152/360; 152/361 DM
[58] Field of Search ..... 152/361 R, 361 DM, 361 FP, 152/360

[56] References Cited

U.S. PATENT DOCUMENTS 3,814,162  6/1974  Hashida et al. ............ 152/361 DM
3,874,436  4/1975  Hashida et al. ............ 152/361 DM

FOREIGN PATENT DOCUMENTS 1001585  2/1952  France ......................... 152/361 R
851898  10/1960  United Kingdom ............ 152/361 DM Primary Examiner—John T. Goolkasian
Assistant Examiner—Lois E. Rodgers
Attorney, Agent, or Firm—Brumbaugh, Graves, Donohue & Raymond

[57] ABSTRACT

A tire with a radial carcass reinforcement anchored in each bead and with a crown reinforcement formed of four crossed working plies forming an angle of between 10° and 45° with the longitudinal direction of the tire is improved due to the fact that the working plies form a block of two superimposed pairs of plies of crossed cables, the plies of the first pair forming opposite angles equal to $\beta$ and the plies of the second pair forming opposite angles equal to $\alpha$, $\beta$ being greater than $\alpha$, the difference $\beta - \alpha$ being at least equal to the value of the expression $h \sin (\beta+\alpha)/2z$ 5 Claims, 3 Drawing Figures

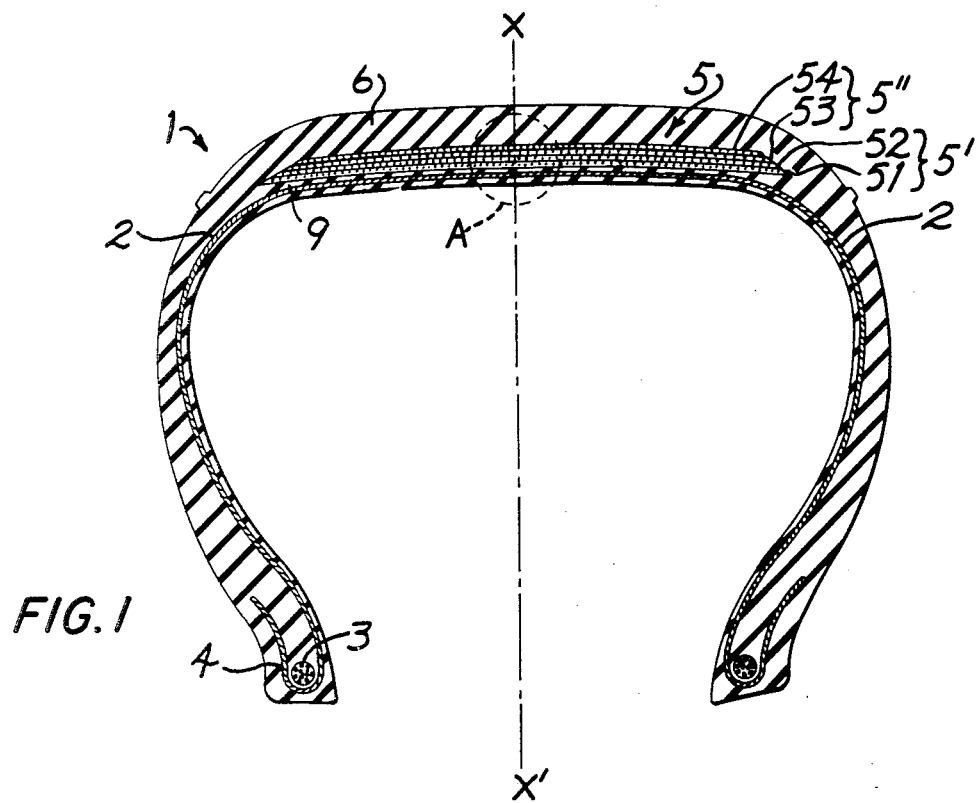
FIG. 1
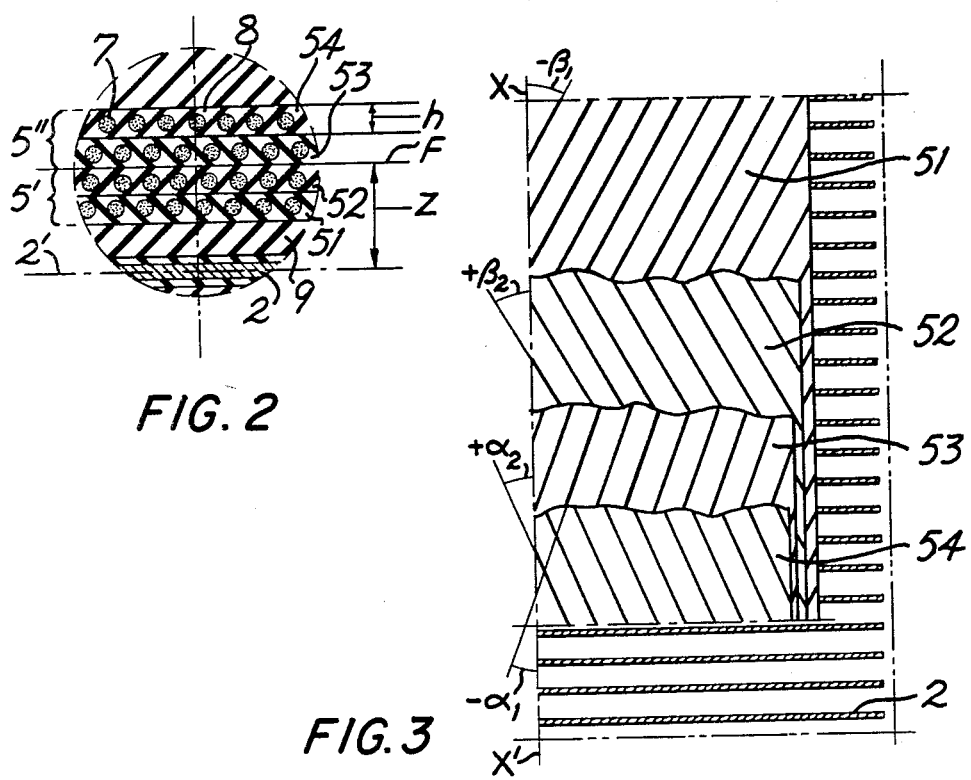
FIG. 2
FIG. 3

RADIAL TIRE WITH CROWN REINFORCEMENT BLOCK OF TWO SUPERIMPOSED PAIRS OF PLIES

The present invention relates to tires having a radial carcass reinforcement formed of at least one ply of cables anchored in each bead to at least one bead ring and a crown reinforcement formed of at least two plies of cables parallel to each ply and crossed from one ply to the other forming an acute angle with the longitudinal direction of the tire.

French Pat. No. 1,001,585 describes a radial carcass tire having a crown reinforcement formed of two crossed plies of cables forming an angle of less than 45° with the longitudinal direction and a third ply of cables forming an angle greater in absolute value than 45° with the longitudinal direction of the tire. The first two plies are referred to as working plies and the third ply as triangulation ply.

Radially on the outside of such a crown reinforcement there may be arranged at least one reinforced ply of elastic reinforcement elements which are either metallic or textile. Such a ply of elastic elements has the function of protecting the crown ply from cuts coming from objects which could perforate the tread, hence its name of crown reinforcement protection ply. Due to the elasticity of the reinforcement elements, the protection ply or plies do not participate in the stabilizing of the crown of the tire, this function being reserved to the crown reinforcement previously described. Accordingly, the protection ply or plies are excluded from the consideration relative to the present invention.

One variant of the crown reinforcement described above consists in causing the radial carcass reinforcement to cooperate with the two crossed working plies. The radial carcass reinforcement then takes the place of the triangulation ply, each of the two working plies forming a relatively small angle of between 10° and 45° with the longitudinal direction.

The radial carcass reinforcement acts as neutral fiber in a meridian plane and the crown reinforcements of the triangulated type have reduced resistance to separation due to shearing of the rubber between the working plies as a result of the inflation, the deflection under load and the stresses caused by the drifting of the tire upon travel.

On the other hand, these crown reinforcements appear to withstand well the flexings caused by the passing of the tire over obstacles such as stones, rocks, holes, etc. As a matter of fact, the two crossed working plies which form angles rather close to each other in absolute value with the longitudinal direction deform in their plane by a shearing in the same direction. The result is that the reinforcement elements are subjected to little stress in the longitudinal direction and that the layer of intermediate rubber between the two plies is not subjected to extensive shear in its thickness.

It has been found that the stresses which generate separation due to the drifting of the tire can be distributed more favorably by multiplying the number of working plies, for instance by using four working plies crossed symmetrically forming angles $+\delta$, $-\delta$, $+\gamma$, $-\gamma$ with respect to the longitudinal direction and by distributing the reinforcement elements used in the customary two working plies over the four working plies in such a manner that they each have the same thickness and the same rigidity to extension measured perpendicular to the reinforcement elements of the ply.

With the angles customarily used to obtain good road-holding properties of the tire, the increase in rigidity of the block formed by these four plies with respect to longitudinal flexing on an obstacle arranged parallel to the axis of rotation would appear to be a matter over which little influence could be exerted. However, it would appear desirable to influence the stresses due to the flexure of the crown in a meridian plane over an obstacle arranged perpendicular to the axis of rotation of the tire.

Thus the object of the present invention is to limit, within the crown reinforcement having four crossed working plies described above, the placing under compression of the reinforcement elements on the two plies radially furthest from the radial carcass reinforcement, as well as the placing under extension of the reinforcement elements of the two plies radially closest to the radial carcass reinforcement. In fact, it is known that the customary reinforcement elements (wires, filaments, textile or metallic cables) have a low resistance to fatigue under axial compression.

In accordance with the invention, the solution consists in using, in cooperation with a radial carcass reinforcement, a block of four working crown plies which is arranged radially outward of the radial carcass reinforcement and is formed of two superimposed pairs of plies of cables which are parallel in each ply and crossed from one ply to the next with respect to the longitudinal direction, the plies of the first pair which is radially closest to the radial carcass reinforcement forming angles $\beta_1$ and $\beta_2$ of arithmetic average equal to $\beta$ radian and the plies of the second pair forming angles $\alpha_1$ and $\alpha_2$ of arithmetic average equal to $\alpha$ radian, the difference $\beta - \alpha$ radian being at least equal to the value of the expression h sin $(\beta+\alpha)/2z$, $\beta$ being greater in absolute value than $\alpha$, z being the distance from the middle fiber of the radial carcass reinforcement to the interface between the two pairs of working plies, and h being the thickness of each working ply, z and h being measured along the intersection of the equatorial plane with the tire and the angles $\alpha_1$, $\alpha_2$, and $\beta_1$, $\beta_2$ differing by at most 0.026 radian from the angles $\alpha$ and $\beta$, respectively, these angles $\alpha_1$, $\alpha_2$, $\beta_1$, $\beta_2$ being measured with respect to the said intersection. The equatorial thickness h of a working ply is the total thickness, including the calendering rubber, measured at the intersection of the equatorial plane with a meridian section of the tire. The distance z is measured between a point located at the same intersection midway between the two pairs of working plies and another point located on the neutral or middle fiber of the radial carcass reinforcement considered in meridian section. The radial carcass reinforcement may have, particularly in the area of the crown, several superimposed radial plies. In this case, the distance z is to be measured from the neutral or middle fiber of the radial carcass reinforcement considered in meridian section. The expression "radial carcass reinforcement" also comprises the case in which the inclination of the ply or plies differs from the radial inclination by at most 10°. The distance z also comprises the thickness of the layer of rubber which may be interposed between the radial carcass reinforcement and the crown reinforcement in accordance with the invention.

Preferably the difference $\beta - \alpha$ equal to the expression h sin $(\beta+\alpha)/2z$. In this case a meridian flexure of the crown reinforcement in accordance with the invention does not cause an axial deformation of the reinforcement elements.

On the otherhand, if the difference $\beta - \alpha$ is greater than the above expression, then the axial deformations of the reinforcement elements due to a meridian flexure are of opposite sign to those due to circumferential flexure, the center of curvature of the two flexures being of course on the same side of the carcass reinforcement.

Beyond a difference $\beta - \alpha$ of 0.35 radian, the resistance to separation due to shearing of the rubber between the working plies as a result of the inflation, the deflection under load and the stresses caused by the drifting of the tire upon travel, leaves a lot to be desired.

Preferably the differences between the angles $|\alpha_1| - |\alpha_2|$ and $|\beta_1| - |\beta_2|$, respectively, are zero, that is to say it is advisable, in order to enjoy the full benefit of the invention to avoid the presence of irregularities and manufacturing differences in the tires which are manufactured.

It is advantageous to use, as reinforcement elements for the working plies in accordance with the invention, individual wires, preferably of metal, for instance of steel. These individual wires are juxtaposed in parallel to form a ply. In this way the surface of the reinforcement elements adhering to the calendering rubber is optimized; the amount and accordingly the cost of the reinforcement elements required is substantially decreased; the crown reinforcement is made lighter and at the same time thinner. This embodiment is of considerable interest, in particular in tires for high-speed vehicles, due to the small radial thickness of such a crown reinforcement and the possibilities which the invention provides for regulating the rigidity to drifting, the distribution of the pressures and the slippage in the area of contact as well as to reduce the heating in the crown.

Accordingly, throughout this entire specification and in the claims, the term "cable" also includes a wire or any filiform element used by itself or in combination with others to form a reinforcement element.

The drawing to which the following description refers is intended to faciliate an undestanding of the invention by showing one embodiment thereof; in this drawing FIG. 1 is a view in meridian section through a tire in accordance with the invention, FIG. 2 is a view on a larger scale of the part of the tire which is surrounded by the circle A in FIG. 1, and FIG. 3 is a developed plan view of a portion of the different plies constituting the radial carcass reinforcement and the working plies of the tire shown in FIGS. 1 and 2.

The tire 1 of FIG. 1 has a radial carcass reinforcement 2 formed of a ply of radial steel cables turned up towards the outside around a bead ring 3 in each bead 4. Radially outward of the radial carcass reinforcement 2 there is arranged a block 5 in accordance with the invention consisting of four working plies 51, 52, 53, 54 having a width close to that of the thread 6. The meridian radius of curvature of the block 5 is preferably greater than its equatorial radius of curvature. The working plies 51 and 52 form the first pair 5' of working plies which is radially closest to the radial carcass reinforcement 2, the working plies 53 and 54 forming the second pair 5" of working plies. A layer of rubber 9, preferably of constant thickness, separates the ply of the radial carcass reinforcement 2 from the working ply 51.

In FIG. 1 there can also be noted the trace X-X' of the equatorial plane on the plane of the drawing.

In FIG. 2 it is seen that each working ply 51 to 54 is composed of cables 7 coated by rubber 8 so as to be separated from each other in one and the same ply and from one ply to the next. Each of these working plies 51 to 54, as well as the ply of the radial carcass reinforcement 2 has the thickness h (as defined above). The middle fiber of the radial carcass reinforcement 2 is represented by the dot-dash line of axis 2'. The interface F between the two pairs 5' and 5" of working plies is located midway between the working ply 52 of the pair 5' and the working ply 53 of the pair 5". The distance (as defined above) from the middle fiber 2' of the radial carcass reinforcement 2 to the interface F is designed by the letter z. The working plies 51 and 52 form angles $-\beta_1$, $+\beta_2$ and the working plies 53 and 54 form angles $-\alpha_1$, $+\alpha_2$ with respect to the trace X-X' of the equatorial plane on the plane of the drawing. The angles $-\beta_1$, $+\beta_2$ are larger than the angles $-\alpha_1$, $+\alpha_2$ in absolute value, the arithmetic average $\beta$ of $\beta_1$ and $\beta_2$ being, in accordance with the invention, greater than the arithmetic average $\alpha$ of $\alpha_1$ and $\alpha_2$.

The angles $\beta$ and $\alpha$ can, for instance, have limit values translated into degrees in the event that $\beta - \alpha = (h/2z) \sin (\beta + \alpha)$ and $|\alpha_1| = |\alpha_2|$ and $|\beta_1| = |\beta_2|$:

| $\beta°$ | 21 | 23 | 25 | 27.5 | 29.5 |
|---|---|---|---|---|---|
| $\alpha°$ | 16 | 18 | 20 | 21.5 | 23.5 | for a value of the ratio h/2z equal to 0.133.

What is claimed is:

1. A tire with a radial carcass reinforcement anchored in each bead to at least one bead ring and with a crown reinforcement formed, in addition to the portion of the radial carcass reinforcement concerned, by four working plies crossed from one ply to the other forming an angle of between 10° and 45° with the longitudinal direction of the tire and each having the same thickness and same rigidity to extension per unit of width, the said four working plies being arranged radially outward of the radial carcass reinforcement, characterized by the fact that the four working plies form a block of two superimposed pairs of plies of cables parallel in each ply and crossed from one ply to the next with respect to the longitudinal direction, the plies of the first pair which is radially closest to the radial carcass reinforcement forming angles $\beta_1$ and $\beta_2$ of arithmetic average equal to $\beta$ radian and the plies of the second pair forming angles $\alpha_1$ and $\alpha_2$ of arithmetic average equal to $\alpha$ radian, the difference $\beta - \alpha$ radian being at least equal to the value of the expression h sin $(\beta + \alpha)/2z$, $\beta$ being greater in absolute value than $\alpha$, z being the distance from the middle fiber of the radial carcass reinforcement to the interface between the two pairs of four working plies, and h being the thickness of each working ply, z and h being measured along the intersection of the equatorial plane with the tire and the angles $\alpha_1$, $\alpha_2$ and $\beta_1$, $\beta_2$ differing by at most 0.026 radian from the angles $\alpha$ and $\beta$, respectively, the angles $\alpha_1$, $\alpha_2$, $\beta_1$, $\beta_2$ being measured with respect to said intersection.

2. The tire according to claim 1, characterized by the fact that a layer of rubber, preferably of constant thickness, is interposed between the radial carcass reinforcement and the block of four working plies.

3. The tire according to claim 1 or claim 2, characterized by the fact that the difference $\beta - \alpha$ is at most equal to 0.35 radian.

4. The tire according to claim 1, characterized by the fact that the four working plies are reinforced by means of individual metal wires, preferably of steel.

5. The tire according to claim 1, characterized by the fact that the meridian radius of curvature of the block of four working plies is greater than its equatorial radius of curvature.

* * * * *

UNITED STATES PATENT AND TRADEMARK OFFICE
CERTIFICATE OF CORRECTION

PATENT NO. : 4,215,736

DATED : August 5, 1980

INVENTOR(S) : Yves Herbelleau

It is certified that error appears in the above-identified patent and that said Letters Patent are hereby corrected as shown below:

Col. 1, line 10, "parallel to" should read -- parallel in --; line 34, "consideration" should read -- considerations --. Col. 2, line 16, after "elements", "on" should read -- of --; line 50, after "located", "at" should read -- on --; line 66, before "equal" insert -- is --. Col. 3, line 43, "undestanding" should read -- understanding --. Col. 4, line 15, "designed" should read -- designated --.

Signed and Sealed this

Twenty-fifth Day of November 1980

[SEAL]

Attest:

SIDNEY A. DIAMOND

Attesting Officer

Commissioner of Patents and Trademarks